Jan. 23, 1968            J. HEIL            3,365,011
LETTER BALANCE
Filed Oct. 24, 1965
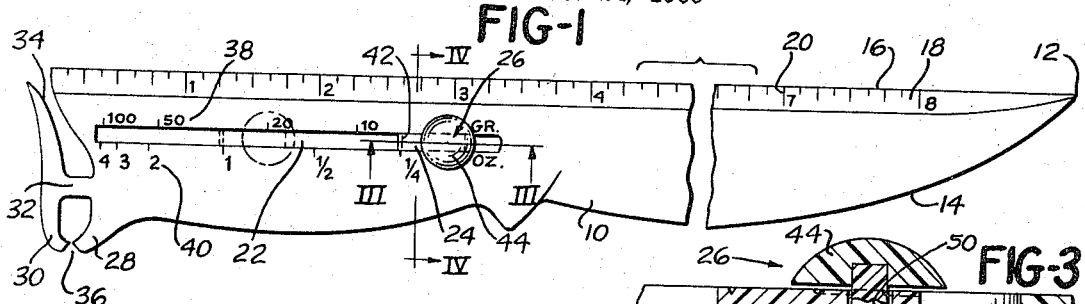
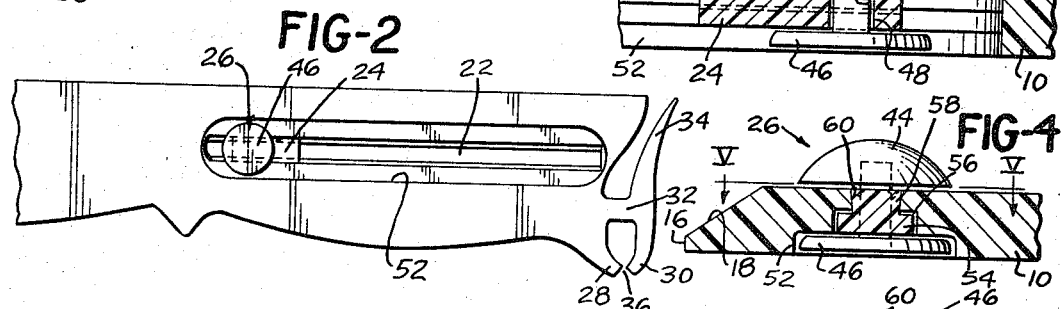
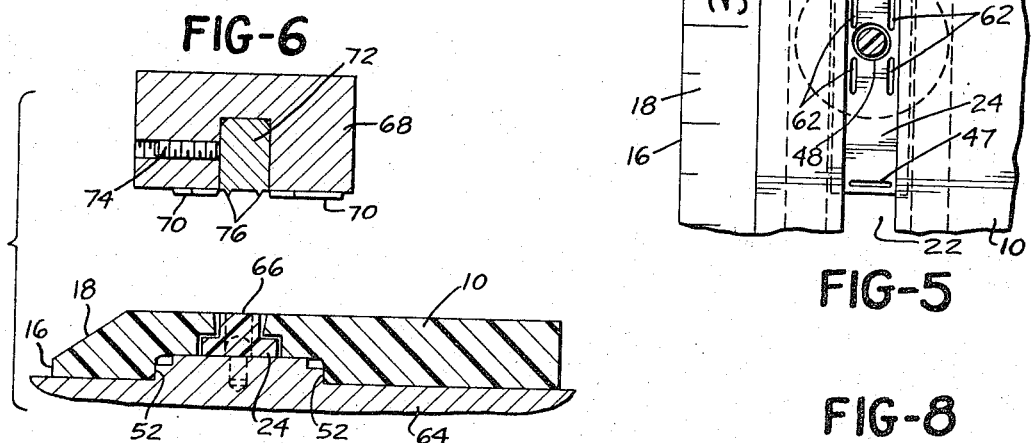
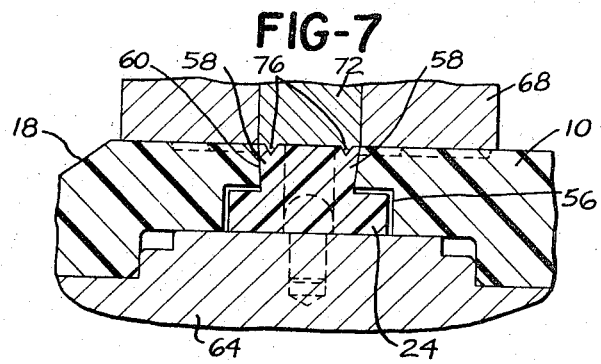
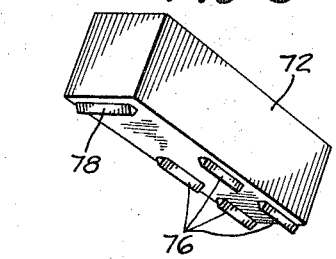
INVENTOR.
John Heil
BY

United States Patent Office 3,365,011
Patented Jan. 23, 1968

3,365,011
LETTER BALANCE
John Heil, 5571 Folkestone Drive,
Dayton, Ohio 45459
Filed Oct. 24, 1965, Ser. No. 504,563
7 Claims. (Cl. 177—172)

The present invention relates to a letter balance in the form of a combination ruler and paper knife and is particularly concerned with improvements in the construction thereof pertaining to the balancing of the letter balance during the weighing of a letter or the like.

A letter balance somewhat similar in general nature to what is disclosed herein is shown in United States Patent to Nielsen No. 2,612,365. The letter balance shown in the Nielsen patent is provided with a plurality of finger grippable pivot or fulcrum member where the letter balance can be engaged to determine the weight of a letter or other articles held thereby. In the Nielsen patent these points of engagement are in the form of pivot pins extending rotatably through the letter balance and having buttons on the opposite ends thereof extending out from both sides of the letter balance so that the buttons can be grasped between the thumb and a finger and thereby determine the balance of the letter.

The present invention represents an improvement over the letter balance shown in the Nielsen patent and likewise represents improvement in the method of manufacturing such a letter balance.

In the arrangement according to the present application, instead of a plurality of pivot members located at different points along the balance to provide for balance points along the letter balance, there is provided an infinitely adjustable slide member so that only one gripping and fulcrum point is provided on the letter balance and which gripping and fulcrum point can be moved longitudinally along the letter balance to determine the weight of a letter or the like gripped in the balance.

The present invention is particularly concerned with the provision of a slide member of the nature referred to in a letter balance and to a method of connecting the slide to the letter balance.

With the foregoing in mind, it will be evident that a primary objective of the present invention is the provision of an improved letter balance of the nature referred to.

A particular object of the present invention is the provision of a simple inexpensive letter balance having a single gripping or supporting fulcrum means thereon which is slidable in the direction of the length of the letter balance.

Another particular object of the present invention is the provision of a method of connecting the slide to the letter balance so that it is permanently frictionally engaged therewith whereby the slide will not tend to move accidentally in the letter balance but must be deliberately shifted along.

Another object of the present invention is the provision of a letter balance of the nature referred to having a rule formed along one edge thereof and in which the letter balance can lay perfectly flat on a surface to permit the ruler to be utilized to its full capacity.

A still further object of this invention is the provision of an improved letter balance which is inexpensive to construct and which will operate in an improved manner and which will remain highly efficient in operation for a long time.

The objects referred to above as well as still other objects and advantages of the present invention will become more apparent upon reference to the following detailed specification taken in connection with the accompanying drawings in which:

FIGURE 1 is an elevational view of a letter balance according to the present invention partly broken away;

FIGURE 2 is a view looking in from the back of the left side of FIGURE 1;

FIGURE 3 is a sectional view indicated by line III—III on FIGURE 1 and drawn at enlarged scale;

FIGURE 4 is a sectional view indicated by line IV—IV on FIGURE 1 and also drawn at enlarged scale;

FIGURE 5 is a sectional view indicated by line V—V on FIGURE 4;

FIGURE 6 is a somewhat schematic view showing a step in the manufacture of the letter balance according to the present invention, said step comprising the positioning of the body of the letter balance and the slide member between cooperating elements of a stamping die;

FIGURE 7 is a view similar to FIGURE 6 but drawn at somewhat enlarged scale and showing the parts of the stamping die in engagement with the body of the letter balance and the said slide; and FIGURE 8 is a perspective view showing the portion of the stamping die which operates upon the slide on the letter balance.

Referring to the drawings somewhat more in detail, in FIGURE 1, 10 represents the body of the letter balance and it will be seen to be in the form of an elongated member having a pointed end 12 and which pointed end permits the member to be inserted into an envelope for tearing the envelope open. The body of the letter opener has a curved side at 14 which is relatively sharp so that it can be employed for cutting an envelope open whereas the opposite edge at 16 of the body of the letter balance is beveled as at 18 and has graduations 20 thereon. This side of the letter balance is straight and can thus be used as a rule and as a scale.

The left end of the body of the letter balance is provided with an elongated slot 22 and disposed in the slot is a slide 24. Rotatably extending through the slide is a finger grippable pivot or fulcrum member 26 to be described more fully hereinafter and by means of which the letter balance can be supported during the weighing of a letter or the like.

At the extreme left end of the letter balance is an arrangement comprising a first jaw 28 which is in the form of an extension of the body member and a second jaw 30 which is connected to the body member by a flexible neck portion 32. Projecting from the neck portion on the side opposite jaw 30 is a lever member 34 which can be availed of for opening and closing jaws 28 and 30. Jaws 28 and 30 are normally disposed in engagement, or extremely close to each other, so that letters and the like, or even a few sheets of paper can be gripped therebetween.

The jaws can be opened by availing of lever 34 to permit articles to be inserted between the jaws or to be released therefrom. Preferably, the jaws having a tapered entrance throat at 36 so that letters and the like can merely be pushed between the jaws to be gripped thereby. It is preferable, upon finishing the weighing of an article, to depress lever 34 so that the article, an envelope, for example, will not be damaged in any way by the points of jaws 28 and 30 upon removing the article therefrom.

On opposite sides of slot 22 there are provided graduations such as graduations 38 along the top of the slot, which represent grams, and graduation 40 along the bottom of the slot, which represents ounces. Furthermore, the slide 24 is provided with an index mark 42 extending thereacross which is adapted for registration with the graduations on opposite sides of slot 22.

Reference to FIGURES 3, 4 and 5 will show that the gripping means 26 pertaining to slide 24 is in the form of a rounded button 44 on the top of the slide and a flat button 46 on the bottom or back of the slide with a post 48, preferably integral with button 46, extending loosely through aperture 50 in the slide and into engagement with button 44. As will be seen in FIGURES 3 and 4, the buttons 44 and 46 are slightly spaced from the opposite sides of the body of the letter balance so that they do not in any way interfere with free tilting of the body of the letter balance about the axis of post 48.

It will furthermore be seen in FIGURES 2, 3 and 4 that there is provided on the back of bottom of the body of the letter balance a depression 52 substantially coextensive with slot 22 longitudinally while extending laterally from both sides of the slot and of a size to receive entirely therein the button 46. The provision of the elongated recess 50 provides that the letter balance can be laid flat on a surface for use of the scale portion or rule portion thereof. At the same time, the button 46 is freely accessible for being gripped by the thumb or finger when the letter balance is used in the operation of weighing a letter or the like.

FIGURES 4 and 5 show a feature of the present invention pertaining to maintaining frictional engagement of slide 24 with the sides of slot 22 in which the slide is slidable. In FIGURE 4 it will be noted that the slide has a wider portion 54 on the side thereof toward button 46 which fits relatively loosely in the side portion 56 of slot 22. Extending from wider portion 54 of the slide is a narrower portion 58 which fits in a somewhat dove-tailed narrower portion 60 of slide 22. This dove-tail portion may have its side walls disposed at angles of from 4 to 10 degrees from the vertical, the particular angle depending on individual preference.

The slide has the end of its narrower portion 58 adjacent button 44 somewhat spread outwardly into frictional pressure engagement with the sides of portion 60 of slot 22 by the forming in the slide, preferably with a heated tool, of the depression 62 which will best be seen in FIGURE 5. These depressions, when formed into the slide will tend to spread the slide and cause it to engage the sides of slot 22 so that the slide will be held relatively tightly in the slot. The slide can, of course, be readily moved by the fingers when the buttons 44 and 46 are gripped between the thumb and finger but the slide will remain in any position of adjustment along the slide until deliberately moved in the aforesaid manner.

The forming of the depressions or notches or recesses 62 in the slide is advantageously carried out by a stamping or embossing operating simultaneously with the placing on the body of the letter balance of the graduations 38 and 40 and the index mark 42 on the slide.

This may be done as indicated in FIGURES 6 and 7. In FIGURE 6 the lower part 64 of a die set is constructed so as to receive and locate and support the body of the letter balance. The die is also provided with a locating pin 66 and this pin is received in the aperture 50 of the slide 24 to locate the slide relative to the body member for the stamping or embossing operation. The upper portion of the die set consists of the stamping portion 68 which, on its under side, carries the sharpened projections 70 for forming the numerals and lines pertaining to the graduations 38 and 40 previously referred to and illustrated in FIGURE 1. The die also has a member 72 inserted therein and held in place as by a set screw 74. Member 72 has on its under side the sharpened projections 76 for forming the notches or depressions 62 in the top of the slide for laterally expanding the slide.

FIGURE 8 is a perspective of member 72 and it will be seen in that view that, in addition to the sharpened projection 76, this member also carries a sharpened projection 78 by means of which the index mark 42 is placed on slide 24. As mentioned, the die part 68 and member 72 are preferably heated and the material of which the slide and the body of the letter balance is made is preferably a plastic material which will flow somewhat under the application of heat. With die part 68 and inserted member 72 at the proper temperature, the die parts are brought together as shown in FIGURE 7 wherein it will be seen that the narrower portion 58 of the slide is caused to spread out and thereby frictionally engage the sides of slot 22 in the body 10 while simultaneously the graduations above referred to are imparted to the body of the letter balance, and index mark 42 is applied to the slide.

The letter body, when removed from the die set, after the operation illustrated in FIGURES 6 and 7 is carried out, has the slide connected thereto and the slide will remain in assembled relation with the body of the letter balance. Thereafter, it is only necessary to insert the button 46 with its post 48 from the back of slide 24, and to press the button 44 down tightly on the projecting end of the post. The assembly of the device is thereby completed and the device is ready for use.

It will be appreciated that the important features of the present invention include the means for utilizing a single slidable fulcrum member to provide for a plurality of balance points along the rule; the double shouldered slot which receives the slide and the bottom button forming a part of the slidable fulcrum device; and the method of connecting the slide with the body of the member so as to retain the slide permanently in frictional engagement with the sides of the slot of the body of the member in which it is slidable.

It will be understood that this invention is susceptible to modification in order to adapt it to different usages and conditions and accordingly it is desired to comprehend such modifications within this invention as may fall within the scope of the appended claims.

What is claimed is:

1. In a letter balance; an elongated substantially flat body member, gripping means at one end of the body member for gripping a letter or the like to be supported by said body member for a weighing operation, a slot in the body member extending longitudinally thereof from near said one end toward the other end of the body member, a slide in said slot, pivot means extending rotatably through said slide and finger grippable from opposite sides of said body member so as tiltably to support, said body member, and cooperating elements of graduation means on one side of said slide and on one side of said body member adjacent said slot for indicating the weight of a letter or the like in said gripping means when the slide is adjusted to its balance position along said slot.

2. In a letter balance; an elongated substantially flat body member, gripping means at one end of the body member for gripping a letter or the like to be supported by said body member for a weighing operation, a slot in the body member extending longitudinally thereof from near said one end toward the other end of the body member, a slide in said slot, pivot means extending rotatably through said slide and finger grippable from opposite sides of said body member so as tiltably to support, said body member, and cooperating elements of graduation means on one side of said slide and on one side of said body member adjacent said slot for indicating the weight of a letter or the like in said gripping means when the slide is adjusted to its balance position along said slide, said pivot means including a button on each side of said body member and a pivot post extending through the slide and connecting said buttons and holding said buttons slightly spaced from opposite sides of said body member, a recess in the side of said body member opposite said one side extending outwardly from both sides of said slot and also extending the length of said slot, the button on said one side of said body member being disposed entirely within said recess so the body member will lay flat on its side containing said recess.

3. A letter balance according to claim 2 in which one edge of said body member is straight so as to form a rule, and graduations on said body member on said one side thereof adjacent said straight edge 4. In a letter balance; an elongated substantially flat body member, gripping means at one end of the body member for gripping a letter or the like to be supported by said body member for a weighing operation, a slot in the body member extending longitudinally thereof from near said one end toward the other end of the body member, a slide in said slot, pivot means extending rotatably through said slide and finger grippable from opposite sides of said body member so as tiltably to support, said body member, and cooperating elements of graduation means on one side of said slide and on one side of said body member adjacent said slot for indicating the weight of a letter or the like in said gripping means when the slide is adjusted to its balance position along said slide, said slide frictionally engaging the lateral edges of said slot and having one end projecting longitudinally in said slot beyond said pivot means, the said element of graduation means on said slide being on said one end thereof so as to be exposed when said pivot means is gripped.

5. In a letter balance; an elongated substantially flat body member, gripping means at one end of the body member for gripping a letter or the like to be supported by said body member for a weighing operation, a slot in the body member extending longitudinally thereof from near said one end toward the other end of the body member, a slide in said slot, pivot means extending rotatably through said slide and finger grippable from opposite sides of said body member so as tiltably to support, said body member, and cooperating elements of graduation means on one side of said slide and on one side of said body member adjacent said slot for indicating the weight of a letter or the like in said gripping means when the slide is adjusted to its balance position along said slide, said pivot means including a button on each side of said body member and a pivot post extending through the slide and connecting said buttons and holding said buttons slightly spaced from opposite sides of said body member, a recess in the side of said body member opposite said one side extending outwardly from both sides of said slot and also extending the length of said slot, the button on said one side of said body member being disposed entirely within said recess so the body member will lay flat on its side containing said recess, said slot having a wider portion toward said recess and a narrower portion toward said one side of said body member, said slide having a wider portion disposed in and freely slidable in said wider portion of said slot and a narrower portion disposed in said narrower portion of said slot and slidable therein and in frictional engagement with the side edges of said narrower portion of said slot.

6. A letter balance according to claim 4 in which said narrower portion of said slot has its side edges divergent toward said one side of said body member and the side edges of said narrower portion of said slide also diverging toward said one side of said body member.

7. A letter balance according to claim 4 in which said narrower portion of said slot has its side edges divergent toward said one side of said body member and the side edges of said narrower portion of said slide being displaced outwardly into frictional engagement therewith.

References Cited

UNITED STATES PATENTS

| 1,872,646 | 8/1932 | Behrens | 177—251 X |
| 2,040,037 | 5/1936 | Wily | 177—245 X |
| 2,612,365 | 9/1952 | Nielsen | 177—251 |

STEPHEN J. TOMSKY, *Primary Examiner.*

GEORGE H. MILLER, JR., *Assistant Examiner.*